Jan. 10, 1950     H. BERNSTEIN     2,494,159
DETACHABLE HANDLE FOR POTS AND PANS

Filed Nov. 16, 1946     2 Sheets-Sheet 1

Inventor

Harry Bernstein

By *Clarence A. O'Brien and Harvey B. Jacobson*
Attorneys

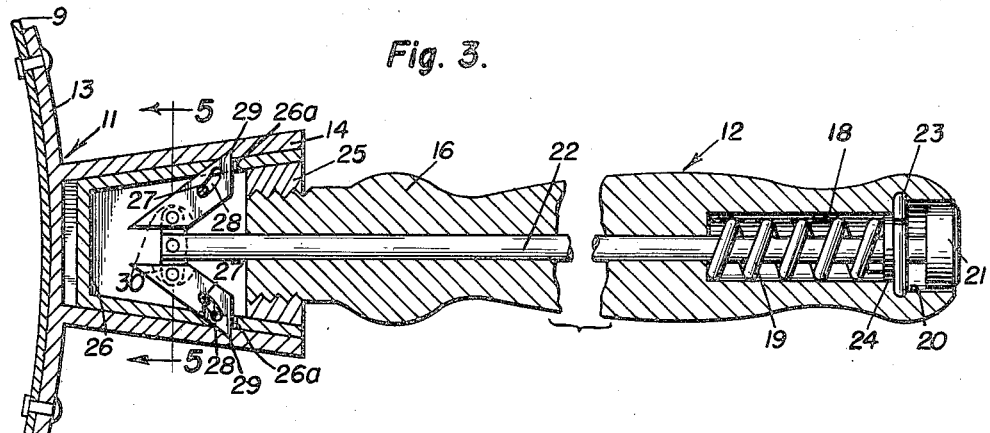
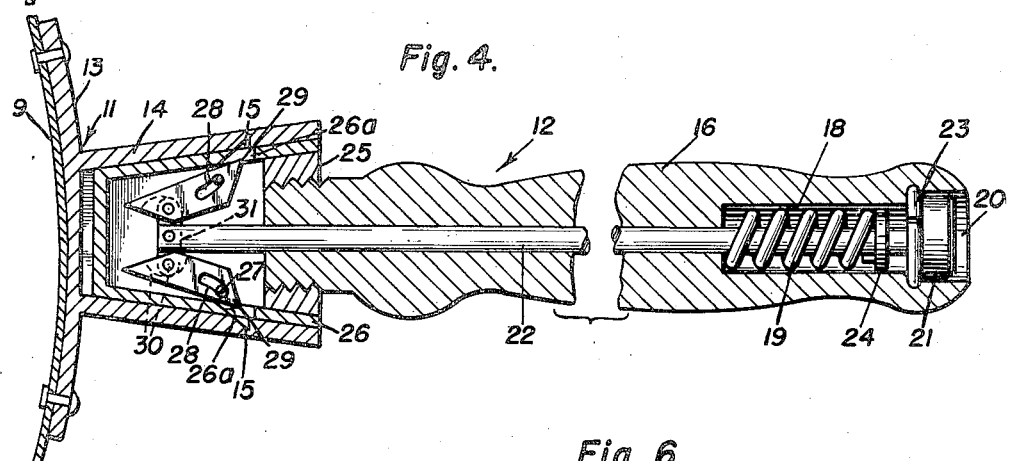
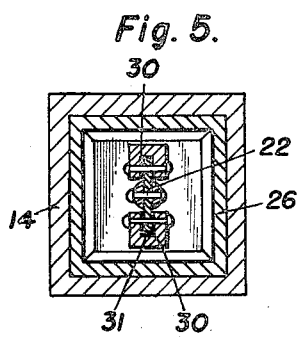
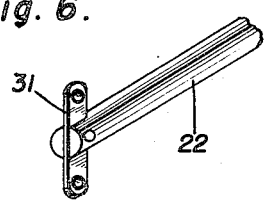

Patented Jan. 10, 1950

2,494,159

UNITED STATES PATENT OFFICE 2,494,159

DETACHABLE HANDLE FOR POTS AND PANS

Harry Bernstein, Elizabeth, N. J.

Application November 16, 1946, Serial No. 710,308

2 Claims. (Cl. 16—114)

This invention relates to the broad class of kitchen utensils and, more particularly, to a detachable handle and novel means for operatively and detachably connecting said handle with pots, pans and the like.

More specifically, the invention has to do with a special socket equipped bracket or fixture which is attached to and carried by the rim of the pan, the same being constructed to accommodate and permit novel detent equipped means on the inner end of a detachable handle to be fitted into and coupled with said socket.

An object of the invention is to provide a suitable and practical handle and ways and means whereby the handle is adequately and aptly readied structurally and functionally for proper detachable connection with the rim of the pan thus lending itself adaptable to commercially satisfactory and efficient use under practically all conditions and circumstances.

Another object of the invention, generally speaking, is to improve upon and reduce the number of parts entering into the overall combination, thereby not only increasing the efficiency of the structure as a whole, but also rendering same less costly from the standpoint of manufacture, sale and use.

It is often necessary to insert a detachable pan handle into a burning hot oven, which necessitates attaching the handle to the pan as quickly as possible. It is therefore an object of the invention to so construct the associated coupling means between the pan and handle that the coupling step may be effected with certainty and rapidity.

It is also a matter of moment to insure that once the coupling is effected between handle and pan rim, it should be positive and reliable. It is therefore an object of the present invention to so construct the parts that the handle is subsantially coupled to the pan rim and that the parts of the coupling co-act in such a manner that the handle is thus attached firmly, whereby to permit the pan to be bodily handled for pouring hot liquids and in such other ways as are, at the time, required.

Other objects, features and advantages of the invention will become more readily apparent from the following description and the accompanying illustrative drawings.

In the drawings, wherein like numerals are employed to designate like parts throughout the same:

Figure 3 is a similar sectional view on a horizontal plane, the same being on the plane of the line 3—3 of Figure 2, looking in the direction of the arrows.

Figure 4 is a view in horizontal section and elevation corresponding to Figure 3 and showing the latching detents released to facilitate detachment and disconnection of the handle.

Figure 5 is a cross-sectional view taken on the plane of the line 5—5 of Figure 3, looking in the direction of the arrows.

Figure 6 is a fragmentary perspective view of the inner end of the latch control rod.

Figure 1:
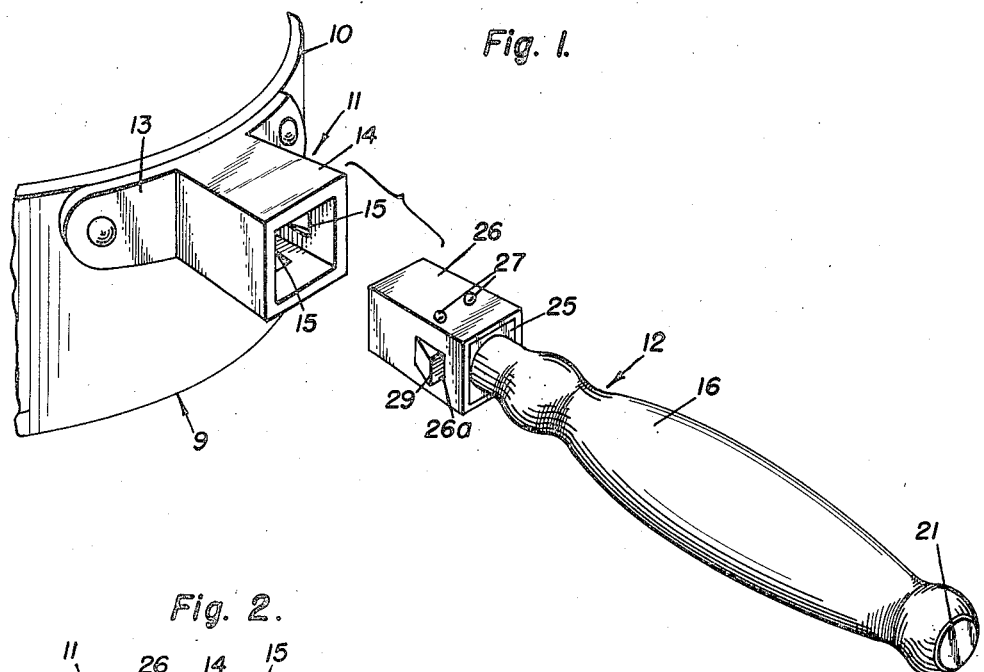
Figure 1 is a perspective view showing a fragmentary portion of a pan, the latter being provided with a special socket to accommodate the improved detachable handle.

The kitchen utensil, which may be a pot, pan or the like, is denoted by the numeral 9, the same including an annular rim 10. The handle attaching bracket or fixture means is indicated, generally speaking, by the numeral 11 and the detachable handle is generally denoted by the numeral 12.

The bracket 11 comprises an attaching plate 13 which is suitably fashioned and riveted or otherwise secured to the rim of the pan and which is provided with an outstanding socket 14, the latter being gradually tapered and rectangular in cross-sectional form. It will be noticed that all four walls, the inner surfaces only, are provided with recesses 15 forming keeper seats.

Figure 2:
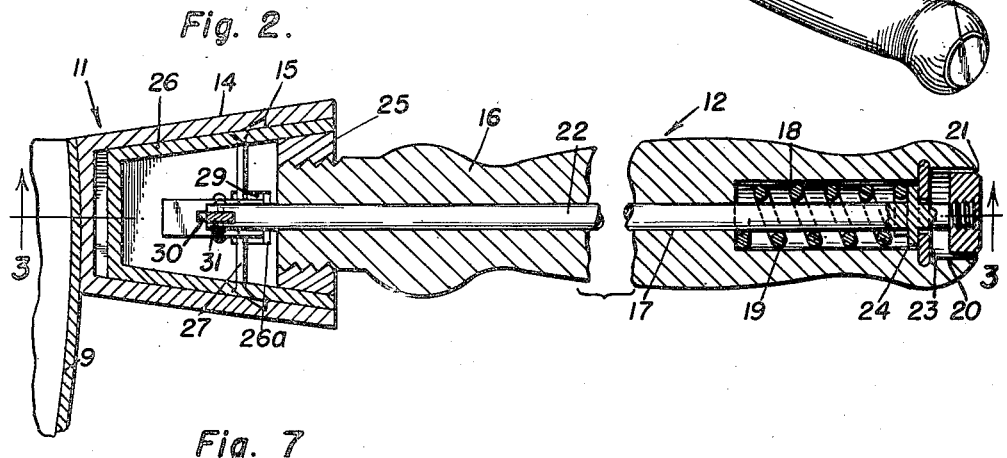
Figure 2 is a central longitudinal sectional view with parts in elevation, taken through the handle, the same being here shown coupled to the pan rim.
Figure 7:
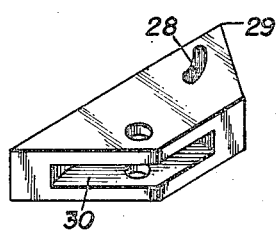
Figure 7 is a perspective view of a dog or pawl such as I employ in the capacity of a retaining latch.

The handle means 12 comprises a handle 16 having a central bore 17 extending therethrough, said bore being counterbored as at 18 to provide a socket for coiled spring 19 and being further counterbored as at 20 to accommodate a pushbutton 21 carried by the outer end of a latch control rod 22, said rod being slidable through the bore and counterbores, the outer end being threaded to accommodate the thumb-button 21. A centrally apertured abutment washer 23 is mounted in the counterbore 20 and the adjacent end portion of the rod extends through the aperture and is provided with a shoulder forming flange 24 which is active against the outermost coil of the coil spring, the coil spring serving to press the flange 24 against the abutment plate 23 and to likewise press the button 21 to a position shown in Figures 2 and 3. The inner end of the handle 16 is provided with a threaded collar 25 which is rigidly mounted in a coupling head 26. The head 26 is of tapered hollow form and fits telescopically into the socket 14 slidably but non-rotatably. Said head is provided with rivets 27 which serve as anchoring and actuating pins, these accommodating cam slots 28 provided in the dogs or latches 29. These latches are of the form shown in Figure 7, each being in the form of a block, one corner portion serving as the latch proper and projecting into the keeper seat 15 by way of an accommodation hole provided in the wall of the head 26. Each block is also provided in one corner with an accommodation notch 30 to accommodate an end portion of a cross-pin 31 on the latch control rod 22. It follows that the latches are pivotally mounted on the cross-head 31 at the inner end of the control rod. Since the cam slots are connected with the cross-pins 27, it is obvious that reciprocation of the control rod serves to either project the latch ends 29 or retract same in relation to the keeper seats 15. By simply telescoping the head 26 into the socket 14 the latches are automatically located in respect to the keeper seats 15 and the spring pressed control or plunger rod serves to automatically snap the latches into place and to couple the head 26 to the coupling 14. When it is desired to separate the parts 14 and 26 this is accomplished by pressing the thumb-button 21 and forcing same into the socket 20. This step compresses the spring means and produces a cam reaction on the latches and said latches are withdrawn from their keeper seats and completely into the interior of the hollow head 26 as shown in Figure 4. This permits the handle and this coupling means to be readily disconnected from the socket 14.

In reviewing the disclosure, it will be seen that the invention covered thereby is exemplified in adequate and reliable structural means, the meeting and co-acting parts are accurately and aptly machined for effecting a quick and reliable coupling between the handle means, socket and utensil. Due to the mechanical functions attending the details as depicted, better management of the steps of attaching and detaching are assured.

It is maintained that an invention characterized by the structural details and mechanism herein advocated for use is aptly fitted for the purposes intended, is structurally readied to attain reliable and resultful ends and is an adaptation destined to fulfill the requirements of the trade.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

What is claimed as new is:

1. In a detachable pot and pan handle of the class described, an elongated handle having an axial bore, a control rod mounted for reciprocation in said bore, the rod having a thumb-button at one end and a shoulder inwardly of said thumb-button, a coiled spring surrounding the rod and arranged in the bore and bearing at one end against the shoulder in a manner to force the button out to a position to ready it for use, said rod being provided at its opposite inner end with a cross-head, a hollow coupling head mounted on said inner end, the cross-head equipped end of said rod projecting into said head, assembling pins mounted in said head, said head having apertures, latches having cam slots mounted on said pins, said latches being pivotally and operatively connected with said cross-head.

2. In a detachable handle for pots and pans, a hollow handle attaching and retaining head, said head being substantially rectangular in cross-sectional form and being adapted to fit into an adapter socket on the rim of a pan or the like, certain walls of said head being provided with apertures to accommodate projectible and retractible latches, a pair of duplicate simultaneously operable latches, said latches having cam slots, pin means in said head, the slotted portions of said latches being pivotally and slidably mounted on said pin means, the outer ends of said latches being lined up with said apertures and being projectible through and beyond the apertures, a handle detachably connected to said head, a rod slidably mounted in said handle, said rod being provided on its outer end with an operating button, the inner end of said rod projecting in said head and being operatively connected with said latches.

HARRY BERNSTEIN.

REFERENCES CITED

The following references are of record in the file of this patent:

UNITED STATES PATENTS

| Number | Name | Date |
| --- | --- | --- |
| 135,822 | La Forge | Feb. 11, 1873 |
| 618,159 | Antes | Jan. 24, 1899 |
| 1,419,860 | Kirby | June 13, 1922 |
| 1,605,981 | Pfefferkorn | Nov. 9, 1926 |
| 1,894,189 | Mortenson | Jan. 10, 1933 |
| 1,915,130 | Krause | June 20, 1933 |
| 2,104,838 | Leonard | Jan. 11, 1938 |
| 2,316,918 | Wallace | Apr. 20, 1943 |

FOREIGN PATENTS

| Number | Country | Date |
| --- | --- | --- |
| 319,664 | France | Mar. 17, 1902 |
| 348,238 | Great Britain | May 14, 1931 |
| 476,116 | Great Britain | Dec. 2, 1937 |